US009374434B2

(12) United States Patent
Sylvain

(10) Patent No.: US 9,374,434 B2
(45) Date of Patent: Jun. 21, 2016

(54) METHODS, SYSTEMS, AND COMPUTER READABLE MEDIA FOR DERIVING USER AVAILABILITY FROM USER CONTEXT AND USER RESPONSES TO COMMUNICATIONS REQUESTS

(75) Inventor: Dany Sylvain, Quebec (CA)

(73) Assignee: GENBAND US LLC, Plano, TX (US)

( * ) Notice: Subject to any disclaimer, the term of this patent is extended or adjusted under 35 U.S.C. 154(b) by 578 days.

(21) Appl. No.: 13/180,577

(22) Filed: Jul. 12, 2011

(65) Prior Publication Data
US 2013/0019004 A1    Jan. 17, 2013

(51) Int. Cl.
*G06F 15/173*    (2006.01)
*H04L 29/08*    (2006.01)
*H04M 3/42*    (2006.01)

(52) U.S. Cl.
CPC ........... *H04L 67/24* (2013.01); *H04M 3/42374* (2013.01); *H04M 3/42357* (2013.01); *H04M 2203/2072* (2013.01)

(58) Field of Classification Search
CPC .............. H04L 67/24; H04M 3/42374; H04M 3/42357; H04M 2203/2072
USPC ........................................................ 709/224
See application file for complete search history.

(56) References Cited

U.S. PATENT DOCUMENTS 6,807,423 B1 * 10/2004 Armstrong .......... H04L 12/1813 370/328
6,882,709 B1    4/2005 Sherlock et al.
7,636,578 B1    12/2009 Cope et al.
7,675,411 B1    3/2010 Michaelis et al.
7,694,127 B2    4/2010 Adams et al.
(Continued)

FOREIGN PATENT DOCUMENTS

EP    1271371 A2    1/2003
EP    2 547 068 A1    7/2012
(Continued)

OTHER PUBLICATIONS

Related application: Subhra Saha et al.; Adaptive Intelligent Optimal Registration Interval Determination Algorithm Ensuring High Availability, filed Dec. 29, 2008 as U.S. Appl. No. 61/141,008.

(Continued)

*Primary Examiner* — Jude Jean Gilles
*Assistant Examiner* — Jaren M Means
(74) *Attorney, Agent, or Firm* — Haynes and Boone, LLP

(57) ABSTRACT

Disclosed herein are methods, systems, and computer readable media for deriving user availability from user context and user responses to communications requests. According to an aspect, a method includes monitoring communications requests. Each of the communications requests may include a request for conducting a communication session between a requesting user and a requested user. The method may also include monitoring user responses to the communications requests. Further, the method may include determining user contexts for the requested user corresponding to each of the communications requests communicated to the requested user. The method may include determining an indication of user availability for the requested user based on the user responses and the corresponding user contexts. The method may also include providing the indication of user availability to one or more authorized users.

35 Claims, 11 Drawing Sheets

(56) References Cited

U.S. PATENT DOCUMENTS

| | | | |
|---|---|---|---|
| 7,903,661 | B2 | 3/2011 | Biswas et al. |
| 7,925,540 | B1 * | 4/2011 | Orttung ................. G06Q 50/14 705/1.1 |
| 2005/0068166 | A1 | 3/2005 | Baker |
| 2006/0085832 | A1 | 4/2006 | Groff et al. |
| 2006/0239255 | A1 | 10/2006 | Ramachandran et al. |
| 2008/0104630 | A1 | 5/2008 | Bruce et al. |
| 2008/0108348 | A1 | 5/2008 | Kottilingal et al. |
| 2008/0159136 | A1 | 7/2008 | Mallesan |
| 2008/0162632 | A1 | 7/2008 | O'Sullivan et al. |
| 2008/0162720 | A1 | 7/2008 | Gulati et al. |
| 2008/0168503 | A1 | 7/2008 | Sparrell |
| 2008/0256192 | A1 * | 10/2008 | Pinard .................... G06Q 30/02 709/206 |
| 2009/0003315 | A1 | 1/2009 | Devdhar et al. |
| 2011/0029647 | A1 * | 2/2011 | Ginevan ................ H04L 12/145 709/223 |
| 2012/0215845 | A1 * | 8/2012 | Aad ........................ H04L 9/008 709/204 |
| 2013/0019004 | A1 | 1/2013 | Sylvain |

FOREIGN PATENT DOCUMENTS

| | | |
|---|---|---|
| GB | 2461368 A | 1/2010 |
| WO | WO 2010/115270 | 10/2010 |

OTHER PUBLICATIONS

Related application: Robert Denman et al.; Systems and Methods for Enabling Personalization of Data Service Plans filed Nov. 16, 2010 as U.S. Appl. No. 61/414,272.

Related application: Nalin Mistry et al.; Integrating Telephony Applications and Television Broadcasts on a Multimedia Device filed May 16, 2008 as U.S. Appl. No. 61/053,782.

Related application: Robert Denman et al.; Systems and Methods for Dynamic Congestion Management in Communications Networks filed Dec. 6, 2010 as U.S. Appl. No. 61/420,272.

Related application: Frederick Kemmerer et al.; Systems and Methods for Intelligent Network Edge Traffic and Signaling Management filed Mar. 3, 2011 as U.S. Appl. No. 61/449,068.

Related application: Subhra Saha et al.; Adaptive Intelligent Optimal Registration Interval Determination Algorithm Ensuring High Availability, filed Mar. 14, 2009 as U.S. Appl. No. 12/404,286, now issued as U.S. Pat. No. 7,945,663 on May 17, 2011.

Related application: Robert Denman et al.; Systems and Methods for Enabling Personalization of Data Service Plans, filed Aug. 31, 2011 as U.S. Appl. No. 13/222,807.

Gill, Phillipa et al., "YouTube Traffic Characterization: A View From the Edge", IMC '07, Oct. 24-26, 2007, San Diego, California, USA, 14 pages.

"Amdocs Policy Controller/PCRF" found at <http://www.bridgewatersystems.com/Policy-Controller.aspx> copyright 1996-2009, Bridgewater Corporation, printed Jan. 16, 2012, 2 pages.

"Bytemobile—Reduce Data Traffic—Lossy Media Optimization" found at <http://archive.org/web/2010102605027/http://bytemobile. com/products-applications/mfs-lossy-media-optimization.html>, on the Internet archive, copyright 2010, Bytemobile, Inc., printed Jan. 16, 2012, 1 page.

"Genband: Traffic & Policy Management" found at <http://genband.com/products/traffic-policy-management.com>, copyright 2012 Genband, printed Jan. 16, 2012, 1 page.

"MDX 9000 Series Media Distribution Switch", found at <http://web.archive.org/web/20100731024602/http://verivue.com/products-verivue-media-distribution-platform-content-distribution-switch.asp>, on the Internet archive, copyright 2010, Verivue, Inc., printed Jan. 16, 2012, 1 page.

"Putting Policy Control to Work", found at <http://www.fiercewireless.com/story/putting-policy-control-work/2010-09-27-0>, copyright 2011, FierceMarkets, printed Jan. 16, 2012, 3 pages.

Related application: Nalin Mistry et al.; Integrating Telephony Applications and Television Broadcasts on a Multimedia Device, filed Dec. 9, 2008 as U.S. Appl. No. 12/330,899.

Corresponding non-final Office Action and accompanying PTO-892 mailed Jan. 26, 2012 for related U.S. Appl. No. 12/330,899 listed above.

Corresponding Applicant's response filed Feb. 20, 2012 to Jan. 26, 2012 Office Action for related U.S. Appl. No. 12/330,899 listed above.

Related application: Robert Denman et al.; Systems and Methods for Dynamic Congestion Management in Communications Networks filed Dec. 6, 2011 as U.S. Appl. No. 13/312,436.

Related application: Kemmerer et al.; Systems and Methods for Intelligent Network Edge Traffic and Signaling Management filed Mar. 5, 2012 as U.S. Appl. No. 13/412,007.

Related application: Dany Sylvain et al.; Methods, Systems, and Computer Readable Media for Deriving User Availability From User Context and User Responses to Communications Requests filed Jul. 12, 2011 as U.S. Appl. No. 13/180,577.

Related application: Subhra Saha et al.; Adaptive Intelligent Optimal Registration Interval Determination Algorithm Ensuring High Availability filed Dec. 18, 2009 as PCT/US09/68723 and published as WO 2010/078076 on Jul. 8, 2010.

Written Opinion/ISR dated Aug. 3, 2010 for related application PCT/US09/68723 filed Dec. 18, 2009.

J. Lin, The multi-agent rendezvous problem—Part I, Journal on Control and Optimization, 2005.

Venkat Anantharam et al., IEEE Trans on comm., Burst Reduction Properties of the Leaky Bucket Flow Control Scheme in ATM Networks, Dec. 1994, vol. 42, No. 12.

Related Chinese application: CN 200910215530.7 filed Dec. 28, 2009, now abandoned. (Based on U.S. Appl. Nos. 61/141,08 and 12/404,286.).

Canadian Intellectual Property Office, Communication—Office Action mailed Feb. 4, 2014, Application No. 2,769,893, 2 pages.

European Patent Office, Communication—Office Action mailed Mar. 13, 2014, Application No. 12176006.0-1853, 6 pages.

Canadian Intellectual Property Office, Communication—Office Action mailed Mar. 27, 2015, Application No. 2,783,013,1 2 pages.

European Patent Office, Communication—Extended Search Report mailed Oct. 10, 2012, Application No. 12176006.0, 7 pages.

Canadian Intellectual Property Office, Examination Search Report mailed Oct. 29, 2015 for European Application No. 2783013, 5 pages.

* cited by examiner

METHODS, SYSTEMS, AND COMPUTER READABLE MEDIA FOR DERIVING USER AVAILABILITY FROM USER CONTEXT AND USER RESPONSES TO COMMUNICATIONS REQUESTS

TECHNICAL FIELD

The presently disclosed subject matter relates to optimizing communications between users. More particularly, the presently disclosed subject matter relates to methods, systems, and computer readable media for deriving user availability from user context and user responses to communications requests.

BACKGROUND

When people interact remotely through telecommunication equipment and services, it may be difficult to determine whether a user is available or not, or whether he or she can be interrupted in his or her current activity. For example, when a user initiates a voice call, a telecommunications system may not take user availability into account. While presence information provides some level of information about the user availability (e.g., online, idle, or on/off the telephone), it can be considered coarse.

A common practice for people with access to instant messaging (IM) that attempts to overcome these issues is to send a short message including the text "are you there" or "can you talk" to the other party, independent of the user presence status. Another conventional solution may include using presence information to provide a snapshot of a user context. This may include either simple indications of user availability (e.g., on/off line) or may include several additional factors (e.g., telephone status or location). However, a drawback to this solution is that it still places the burden of inferring a user's availability on the requester (i.e., the person requesting communications with another user).

Another conventional solution includes requiring users to manually set their availability status. For example, an availability status message may indicate that the user is busy, in a meeting, or out for lunch. However, this solution requires the user to remember to set and update his or her availability status. Moreover, the availability status message set by the user may be a blunt tool which cannot distinguish between different scenarios, for some of which the user may actually be available for communication. For example, a user involved in a meeting may not want to receive phone calls but may be responsive to email or instant messaging.

Yet another conventional technique includes using personal agent call screening and routing. However, again, one drawback to this technique is that it requires the user to setup the rules and to remember to activate/deactivate when their status changes. It also provides no direct feedback to the requestor about the user's availability beyond simply determining that the user was not available by being directed to the user's voicemail service.

Accordingly, in view of these difficulties, a need exists for improved systems and methods for determining a user's availability without burdening either the requesting user or the requested user and that can vary depending on the type of communication used.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein are methods, systems, and computer readable media for deriving user availability from user context and user responses to communications requests. According to an aspect, a method includes monitoring communications requests. Each of the communications requests may include a request for conducting a communication session between a requesting user and a requested user. The method may also include monitoring user responses to the communications requests. Further, the method may include determining user contexts for the requested user corresponding to each of the communications requests communicated to the requested user. The method may include determining an indication of user availability for the requested user based on the user responses and the corresponding user contexts. The method may also include providing the indication of user availability to one or more authorized users.

According to another aspect, a system may include a service node. The service node may include a communications module configured to monitor communications requests. Each of the communications requests may include an electronic request for conducting a communication session between a requesting user and a requested user. The communications module may also be configured to monitor user responses to the communications requests. The service node may also include a user availability inference module configured to determine a user contexts for the requested user corresponding to each of the communications requests communicated to the requested user. The user availability inference module may also be configured to determine an indication of user availability for the requested user based on the user responses and the corresponding user contexts. Further, the user availability inference module may be configured to provide the indication of user availability to the requesting user.

The presently disclosed subject matter may be implemented in software in combination with hardware and/or firmware. For example, the presently disclosed subject matter may be implemented in software executed by one or more processors. In an exemplary implementation, the presently disclosed subject matter may be implemented using a non-transitory computer readable medium having stored thereon executable instructions that when executed by the processor of a computer controls the processor to perform steps. Exemplary non-transitory computer readable media suitable for implementing the presently disclosed subject matter include chip memory devices or disk memory devices accessible by a processor, programmable logic devices, and application specific integrated circuits. In addition, a computer readable medium that implements the presently disclosed subject matter may be located on a single computing platform or may be distributed across plural computing platforms.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

Figure 1:
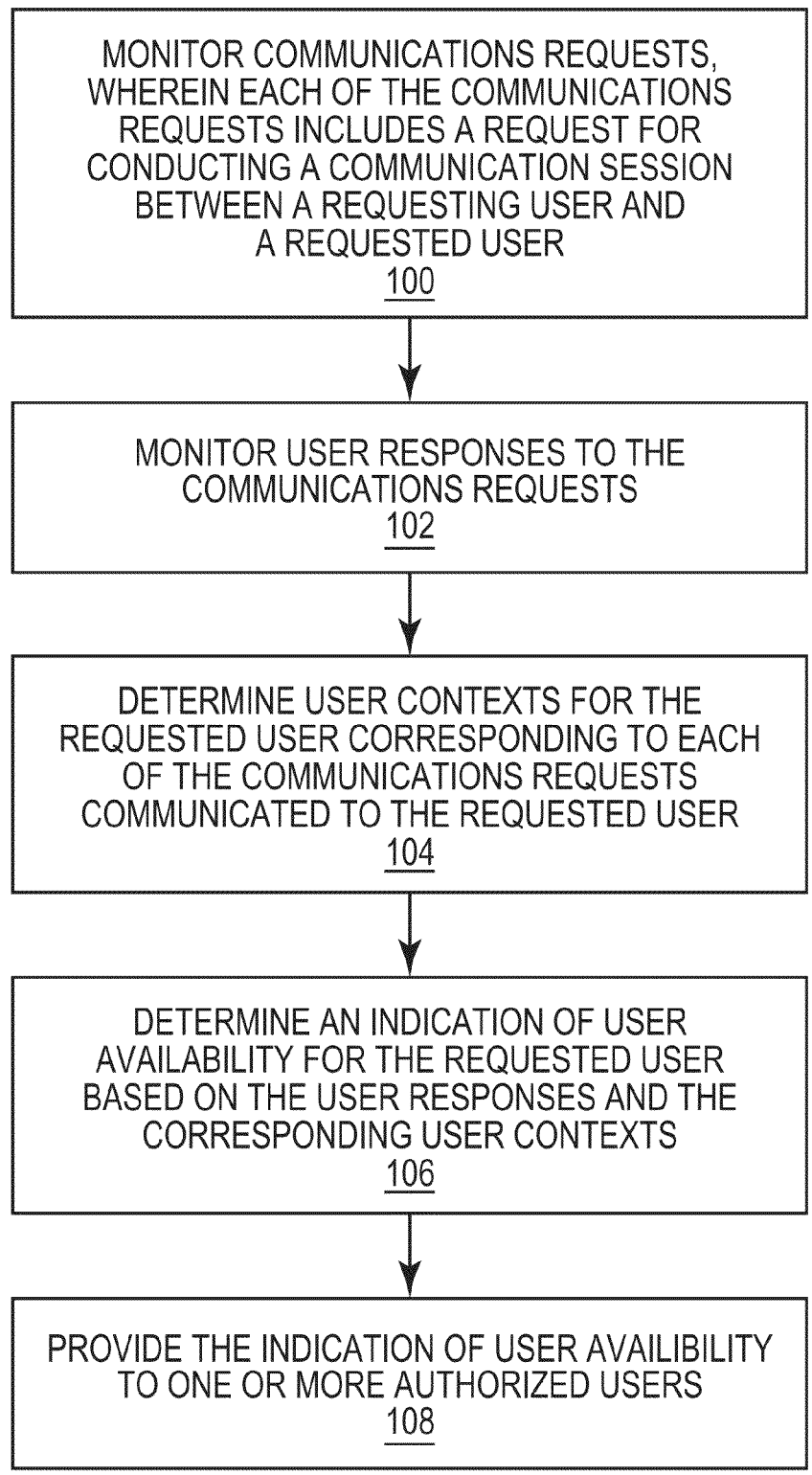
FIG. 1 is a flow chart of an example method for deriving user availability from user context and past user responses to communications requests according to embodiments of the present disclosure.

The presently disclosed invention is described with specificity to meet statutory requirements. However, the description itself is not intended to limit the scope of this patent. Rather, it is contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In order to address the need for improved methods and systems for determining a user's availability without burdening the requesting user or the requested user and which can also vary depending on the type of communication used, methods and systems are disclosed herein for deriving user availability from user context and past user responses to communication requests. Specifically, the presently disclosed subject matter provides an accurate approximation of a user's availability by analyzing prior user responses to communication requests under different user contexts and progressively learning to approximate user availability (e.g., high, medium, low, or none) based on those responses. While still an approximation, an indication of user availability provided according to the subject matter disclosed herein may be more accurate and useful to users desiring to communication with other users. Thus, timely communication between people may be facilitated. For example, a service node may be configured to monitor a user response (e.g., answered, ignored, response time, etc.) to a specific communication request (e.g., source of request, time of request, type of request (e.g., voice call, video call, message, and the like)) under different user contexts (e.g., derived from one or more sources including, but not limited to, presence, location, calendar, media being consumed by the user, used defined, and the like). The service node may derive the current user availability based on prior responses under similar conditions (e.g., requests and context). The service node may then progressively learn and update the availability rules as new requests and responses are analyzed. The indication of user availability can be shared with other users prior to a new communication request or simultaneously with a communication request. Availability data can either be pushed to users or pulled on demand in response to receiving a request regarding the availability of the user.

In accordance with embodiments of the present disclosure, the inferred, user availability information disclosed herein takes into account user context (derived from a variety of user information sources) and past user responses to communication requests to progressively learn (without explicit active user action) an estimate of user availability. The subject matter described herein may be provided as a service to existing Internet service provider (ISP) presence/messenger solutions, or may be a feature of global system for mobile communications association (GSMA) rich communication suite (RCS) deployments.

FIG. 1 illustrates a flow chart of an example method for deriving user availability from user context and past user responses to communications requests according to embodiments of the present disclosure. This example method may be implemented by a service node or any other suitable computing device. Referring to FIG. 1, the method includes monitoring communications requests, where each of the communications requests includes a request for conducting a communication session between a requesting user and a requested user (step 100). For example, a service node may directly monitor communication requests either by integration with a call server, messaging server, and the like, or by being inserted in the signaling path (e.g., IMS application server). The service node may also indirectly monitor communications requests either by receiving a real-time notification from a call server or by receiving call logs or billing records from a call server or messaging server.

In addition to monitoring the context of the communications request, the service node may monitor a variety of metadata associated with the request such as the source information, location, time, type of the request, and the like.

The source of the request may include information such as, but not limited to, a requestor name, a number (e.g., callerID), a session initiation protocol (SIP) address, an email address, an IM address, a social network identity, or other similar electronic identifier. Source information may also include a device type used to send the request such as, but not limited to, whether the request originated from a mobile device, a fixed phone, a SIP user agent, a computer, a television/set top box (STB), and the like. The location of the request may include one of GPS coordinates or a user-defined location (e.g., home or work), whether the call was an internal or external call, and whether the call was local, national, or international. The time of the request may include one of a time, day of the week, and date. The type of the request may include one of a voice call, video call, message (e.g., SMS, MMS, IM, email, and the like), a priority level (e.g., urgent, normal, low, and the like), and a nature of the request (e.g., personal, business, or private).

The method of FIG. 1 includes monitoring the user responses to the communication requests (step 102). Types of user responses may vary depending on the mode of communication requested. Exemplary modes of communication that may be requested by a requesting user may include, but are not limited to, voice calls, video calls, various types of messages, file transfer requests, and application sharing requests. Exemplary user responses to a request for a voice call may include, but are not limited to, Answered, Manually forwarded to another number or voicemail, Not answered, Discarded, and Forwarded to voicemail due to busy condition. Exemplary user responses to a request for a video call may include, but are not limited to, whether the call was answered in Receive only, Transmit only, or Bidirectional modes. Exemplary user responses to a request for a message service message exchange (e.g., SMS, MMS, IM, email, and the like) may include, but are not limited to, whether the message was responded to, a time to respond, whether the requested user did not respond, a number of messages during a chat session, and a duration of chat session. The service node may store some or all of such information.

The method of FIG. 1 includes determining user contexts for the requested user corresponding to each of the communications requests communicated to the requested user (step 104). For example, a service node may derive the user context on demand by gathering user context information from one or more different sources. For example, user context information may be collected when a request is received from one of a location server, presence server, call server, and the like. It is also appreciated that collecting the data relevant to the user context may be performed on an on-going basis and from different sources.

Examples of user context information and possible sources of user context information may include status (e.g., online/offline/idle) information received from a soft client (e.g., IM client). Other example sources of user context information include, but are not limited to, social networks (e.g., the FACEBOOK® social networking service, the TWITTER® social networking service, and the like), a phone status (e.g., on, off, inbound, outbound, duration, and the like), an application sharing (e.g., activity level and duration). Other examples include, but are not limited to, an identity of other parties involved in any current communication sessions (e.g., calls, chat, and the like). Another example includes, but is not limited to, a user location derived via any suitable techniques such as GPS, cell site, user defined, and the like. If the user maintains an electronic calendar, the user's calendar may be gleaned for context information such as whether the user is free or busy and if the user is busy, how long he or she expects to be unavailable. For example, a user may write in their calendar that they will have a particular status until a particular time or the activity may be described by a keyword such as meeting/vacation/appointment. In addition, for example, calendar information may include the identity other parties associated with a current calendar event.

User context information may also include, but is not limited to, a listing or description of user devices currently used such as a computer, PDA/smartphone, phone/mobile, television/STB/PVR, and the like. User context information may include a description of the content currently viewed by the user such as a TV program (e.g., live or recorded), web content or media, music, and the like.

The method of FIG. 1 includes determining an indication of user availability for the requested user based on the combination of the plurality of user responses and the corresponding user contexts (step 106). For example, the service node may use the communication request information, the user context information, and user response to update the availability computation parameters.

Availability can be computed for the specific type of communication request (e.g., call, message, and the like), the requester identity, and/or a group of requesters (who can receive the same availability data). Requesters (i.e., requesting users) can be grouped and receive similar availability information in response to a user availability query or a communications request. For example, groups may include friends, family, work, VIP, employees, customers, partners, and the like. It is appreciated that a requester can have multiple identities (e.g., phone numbers) and may have similar or different responses depending on the identity used (e.g., personal and work).

In an example of determining an indication of user availability, when a user's calendar indicates that the user is busy and the user answers a call from other users, subsequent requests from those same requesting users in the same context (i.e., while requested user's calendar indicates that the requested user is busy) may result in a call availability indication of "medium" for those users and "low" for all other users. This may be because a rule used for combining the communications requests, user context information, and user responses gives more weight to past instances of the requested user behaving in a particular way for a given set of circumstances than for requesting users that have not built up a history with the requested user.

In another example of determining an indication of user availability, a neural network may examine requests, associated user contexts, and user responses as input. The neural network may output an indication of user availability per requesting user or group of requesting users. Each new request and response may be used to update the neural network. A positive user response (e.g., an answered call or message) may increase the indication of the requested user's availability whereas a negative response (e.g., a call goes to voicemail or a message is responded to after more than a predetermined time period has elapsed) may decrease the indication of the requested user's availability for a specific request and/or user context. It may be appreciated that user availability can be calculated as the user context changes (e.g., calendar changes from busy to free) or as required when a new request is received.

The method of FIG. 1 includes providing the indication of user availability to the requesting user (step 108). For example, the indication of user availability may be shared with other users either by a suitable pushing or pulling technique. For example, the indication of user availability may be pushed to subscribed and authorized users as changes occur in the user availability (e.g., presence notification messages). In another example, the indication of user availability may be pulled on demand in response to receiving a request for the indication of user availability. Such a request may be sent via SIP-based messages, web services API queries, and the like.

It may be appreciated that the availability of queries for an indication of user availability may either be restricted to authorized users or may be made available to all. Additionally, the level of detail regarding user availability of a particular user included in an indication of user availability may vary based on the identity of the requesting user. For example, a public query may only get available/not available whereas a query from a friend of the requested user (e.g., pre-defined authorized users) may get much more detailed information regarding the requested user's availability. This may include information such as per communication mode (e.g., voice or IM) availability, level of availability (e.g., high, medium, and low), presence-style information (e.g., online, on the phone, or idle), location (e.g., at home), or a calendar (e.g., busy until 2:00 P.M.).

It may be appreciated that an availability query can take place either prior to a new communication request or at the same time as the communication request. In some cases, an availability query may take place before a new communication request, because a requester can better decide whether or not to initiate communication and using which mode.

An indication of user availability may be provided in various levels of granularity. For example, the indication may be binary (e.g., available/not available), quantized (e.g., high, medium, low, or none), or linear (e.g., range between 0-10).

In accordance with embodiments of the present disclosure, a requested user can review the list of requests and the computed responses. The user may change the setting on the service node such that future computed responses better reflects his or her true availability.

In an example, communications requests may also be presented to the requested user along with the computed response being provided, in real time. The requested user may interact with the service node such that a different availability is pushed to the requester.

In another example, the user availability can be used to filter/route incoming calls and messages. For example, in an embodiment, public incoming calls may automatically be routed to voicemail if a user's availability is not "high" unless the call priority is "urgent." This may be accomplished by the service node by interacting with a communications server (e.g., a SIP application server) in order to provide the filtering/routing logic or by being integrated with the communications server.

Figure 2:
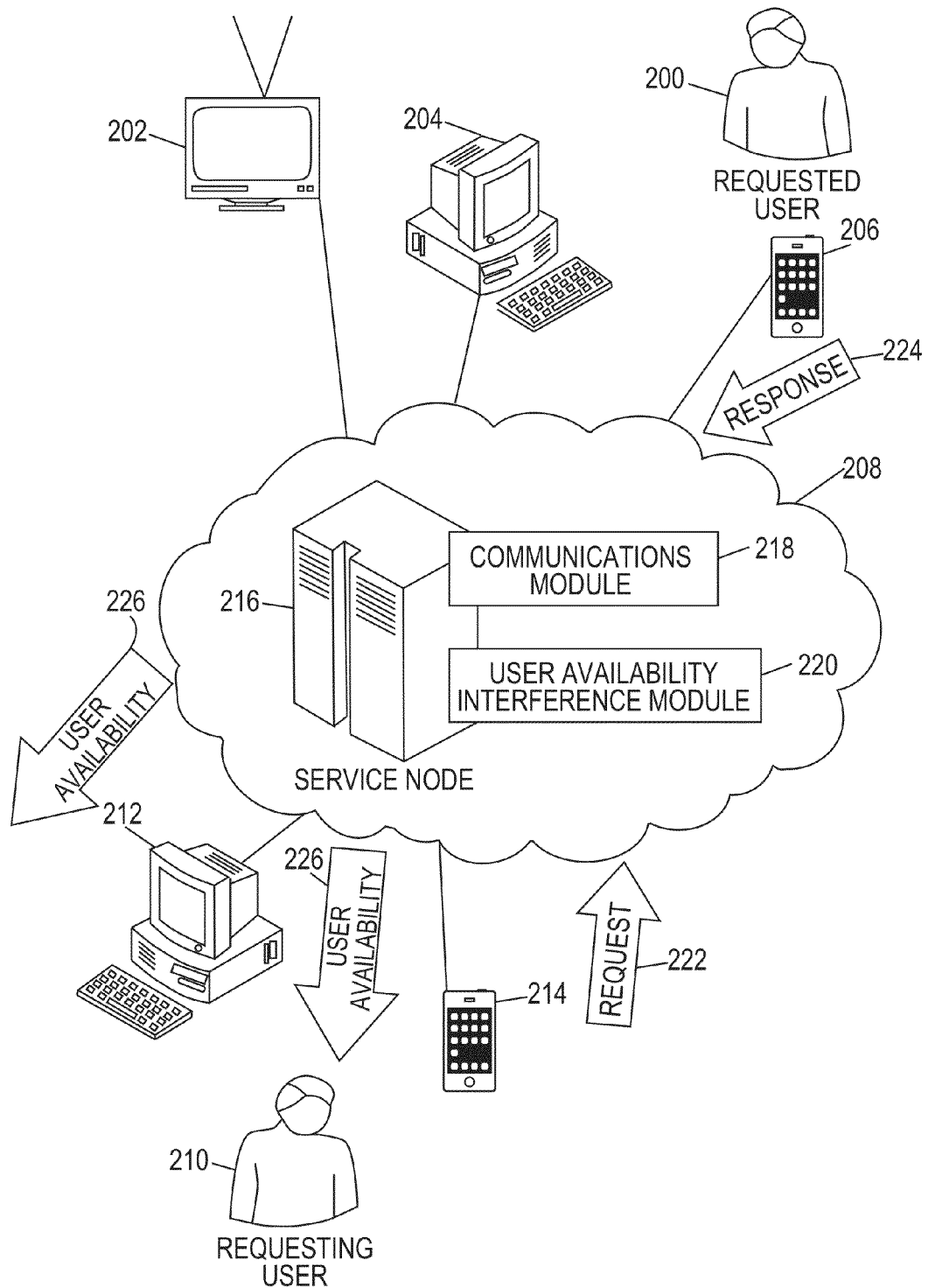
FIG. 2 is a network diagram depicting example components for deriving user availability from user context and past user responses to communication requests according to embodiments of the present disclosure.

FIG. 2 illustrates a network diagram depicting example components for deriving user availability from user context and past user responses to communication requests according to embodiments of the present disclosure. Referring to FIG. 2, a requested user 200 may be a user with whom other users would like to communicate. The requested user 200 may have a variety of communications devices available to him or her that offer a variety of modes of communications. For example, the requested user 200 may watch audiovisual programming using a television 202, send and receive messages using a computer 204, and send and receive telephone calls using a mobile telephone 206. As discussed above, it is appreciated that, for example, television 202 may be further associated with a variety of related devices (not shown) such as a set top box, game console, home theatre receiver, or personal video recorder and that the functionality provided by these devices may also be used for deriving user availability from user context and past user responses to communication requests without departing from the scope of the subject matter described herein. Also, the computer 204 and telephone 206 may be capable of sending and receiving a variety of message types such as a voice call, a video call, an email, a simple message service (SMS) message, a multimedia message service (MMS) message, an instant message, and the like. Communications devices 202, 204, and 206 may each be connected to a communications network 208 (e.g., the Internet or PSTN) in a variety of ways for communicating with other users, depending on the type of communication desired/device used. Thus, for example, the telephone 206 may utilize a cellular communications system and message service message nodes for exchanging message service messages while the computer 204 may utilize a different and/or overlapping set of switches, routers, and nodes for exchanging IP packets.

A requesting user 210 may be a user who would like to communicate with the requested user 200. While a single requesting user 210 is shown for simplicity, it may be appreciated that multiple requesting users may be grouped together for purposes of providing an indication of user availability to the group. The requesting user 210 may also be associated with various communications devices including, but not limited to, a computer 212 and a mobile telephone 214. Communications devices 212 and 214 may also be connected to the network 208 for communicating with the requested user 200.

A service node 216 may be located in the network 208 for deriving user availability from user context and past user responses to communication requests. The service node 216 may include a communications module 218 and user availability inference module 220.

Communications module 218 may be configured to monitor multiple communications requests and multiple user responses to the communications requests. Each of the communications requests may include a request for conducting a communication session between a requesting user and a requested user.

The user availability inference module 220 may be configured to determine multiple user contexts for the requested user corresponding to each of the communications requests communicated to the requested user. The user availability inference module may also be configured to determine an indication of user availability for the requested user based on a combination of the user responses and the corresponding user contexts, and to provide the indication of user availability to the requesting user.

For example, in the example shown in FIG. 2, the requesting user 210 may request communication with the requested user 200 by initiating a voice call from the telephone 214 to the telephone 206. In response to initiation of the voice call, a communications request 222 may be generated, intercepted by the service node 216, and received by the requested user 200. The requested user 200 may then use the telephone 206 to respond (or not respond) to the communications request 222. In this case, the requested user 200 answers the call and returns a user response 224 (e.g., signaling messages associated with call setup and the corresponding voice call). Like the communications request 222, the user response 224 may be intercepted by the service node 216, and the service node 216 may determine a user context for the call. In addition, the user context may include a determination that the TV 202 was turned on (e.g., the requested user 200 was watching the TV 202). An analysis of the combination of past communications requests and corresponding responses and user contexts may be performed to determine an indication of availability under similar circumstances in the future when a communications request may be initiated.

Upon determining an indication of availability of the requested user 200 (e.g., high availability), an indication of user availability 226 may be provided to the requesting user 210. In this example, the indication of user availability 226 is automatically pushed to each of the requesting user's devices 212 and 214. However, as indicated above, the indication of user availability 226 may be provided simultaneously with a next communication request or in response to a request for the indication of user availability 226 without departing from the scope of the subject matter described herein.

Table 1 illustrates some exemplary rules/scenarios for deriving user availability from user context and past user responses to communication requests according to embodiments of present disclosure.

TABLE 1

| Requester | User Context | Indication of Availability |
| --- | --- | --- |
| User A | On line, calendar: in meeting | Msg: Medium, Call: Low |
| User B | On line - idle, calendar: free | Msg: Low, Call: High |
| User C | Location: @home, TV: on, program X | Msg: Low, Call: Medium |
| User D | Location: @home, Time: 5-6 pm (dinner) | Msg: None, Call: None |
| Sport Buddies | TV: program = Football | Msg: High, Call: High, Video call: High |
| Boss | Time: 9 am-5 pm | Msg: High, Call: High |
| Unknown | On line, calendar: in meeting | Msg: Low, Call: Low |

Referring to Table 1, the first row illustrates a first scenario in which the requesting user is User A. With respect to User A, a service node may receive and monitor communications request messages. In addition, the service node may receive user context information indicating that a requested user is online and that his or her calendar indicates that they are currently in a meeting. Based on this user context, the indication of availability for the requested user may include medium for incoming messages and low for incoming calls. An indication of high user availability indicates that the requested user will probably respond to the communications request. An indication of medium availability indicates that the requested user is equally likely to respond as to not respond to the communications request. An indication of low availability indicates that the requested user will probably not respond to the communications request. In this example scenario, the requested user is unlikely to respond to an incoming call while they are in a meeting but may respond to an incoming message.

The second row illustrates a second scenario in which, for requesting User B, the requested user is online but idle and his or her calendar indicates that the requested user is free. In this example, the indication of the requested user's availability that will be provided to User B may include a low availability for incoming messages and a high availability for incoming calls.

The third row illustrates a third scenario in which, for requesting User C, the requested user is located at home and the TV is turned on and tuned to program X. In this example, the indication of the requested user's availability that will be provided to User C may include a low availability for incoming messages and a medium availability for incoming calls.

The fourth row illustrates a fourth scenario in which, for requesting User D, the requested user is located at home and the time is between 5:00 and 6:00 P.M. In this example, the indication of the requested user's availability that will be provided to User D may include no availability for incoming messages and no availability for incoming calls. This may be because the requested user is regularly unavailable at that location during that time period (e.g., dinner, working out, and the like).

The fifth row illustrates a fifth scenario in which an indication of the requested user's availability is provided to a group of users. For example, the group labeled "sports buddies" may be associated with multiple user identifiers. If a communications request is received from a user associated with the group and the requested user's context includes watching football on TV, then the indication of the requested user's availability that will be provided to all users associated with the group may include high availability for each of incoming messages, calls, and video calls. This may be based on analysis of past responses by the requested user within this user context to similar types of communications requests. In other words, because in the past, virtually every time a sports buddy calls or messages the requested user while watching football (presumably about the football game), the requested user responds. This increases the likelihood of the requested user acting the same way (i.e., responding to future communication requests) based on this past history.

The sixth row illustrates a sixth scenario in which an indication of the requested user's availability is provided to a particular requesting user (i.e., a boss of the requested user). In this example, for times between 9:00 A.M. and 5:00 P.M., the requested user may have high availability for incoming messages and for incoming calls.

The seventh row illustrates a seventh scenario in which an indication of the requested user's availability is provided to an unknown requesting user. In this example, when the requested user is online and in a meeting, the requested user may have low availability for incoming messages and for incoming calls.

Figure 3:
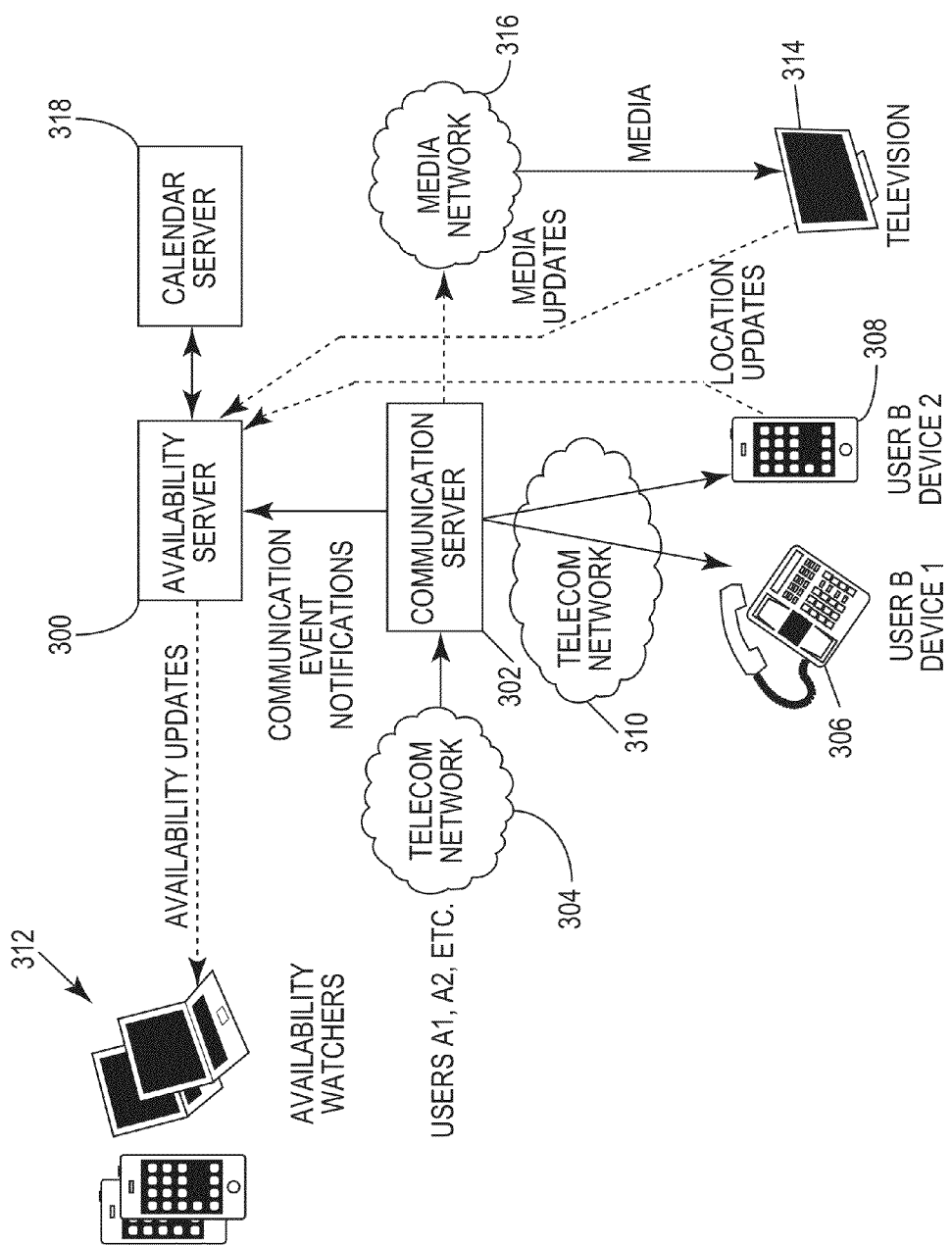
FIG. 3 is a network diagram depicting example components for deriving user availability from user context and past user responses to communication requests according to embodiments of the present disclosure.

FIG. 3 illustrates a network diagram depicting example components for deriving user availability from user context and past user responses to communication requests according to embodiments of the present disclosure. Referring to FIG. 3, an availability server 300 or any other suitable service node may be configured to receive communication event notifications from a communication server 302 or other servers, which are not shown in FIG. 3 for simplification of the illustration. The communication event notifications may be communicated over any suitable network such as, but not limited to, the Internet. Further, for example, the functionality of the availability server 300 and the communication server 302 may be combined within a single server. In an example, the communication event notifications may include communications requests for requested users and corresponding user responses to the communications requests by the requested users as disclosed herein. In this example, the communications requests and responses may be received by the communication server 302 and subsequently forwarded to the availability server 300 by the communication server 302. In another example, the communication server 302 may send to the availability server 300 information contained within the communications requests and responses, and/or information derived from the communications requests and responses. The availability server 300 may be configured to monitor the communications requests and corresponding user responses in accordance with the present disclosure.

In an example, the communications requests received at the communication server 302 may include communications requests from Users A1, A2, and others that are received from a telecommunications network 304, which may be any suitable network such as, but not limited to, the Internet or PSTN. The communications requests may be destined for requested users such as User B, who has User B devices 306 and 308. The communication server 302 may suitably process the communications requests and forward the communications requests to one or both of User B's devices 306 and 308 via a telecommunications network 310, which may be any suitable network such as, but not limited to, the Internet or PSTN. One or both of the User B devices 306 and 308 may generate one or more user responses to the communications requests and may communicate the user response(s) to the communication server 302 via the network 310. The communication server 302 may receive the user response(s) for monitoring and for use in determining a user context of the User B in accordance with the present disclosure.

The availability server 300 may also receive data from various sources for determining user contexts for one or more requested users. For example, the availability server 300 may receive status updates and location updates from the User B device 308, which may be a mobile telephone capable of determining its GPS coordinates and determining a status of the User B. For example, the device 308 may determine a status of the user in accordance with an example disclosed herein, and may communicate a status update to the availability server 300 via the network 310. Further, for example, Availability watchers or subscribers 312 may include users that are subscribed to user availability information associated with one or more other users. For example, one or more subscribers 312 may register with the availability server 300 for receipt of user availability information for one or more users, such as User B. User B may be associated with a television 314 connected to one or more devices such as, but not limited to, a set top box, game console, home theatre receiver, or personal video recorder in communication with a media network 316. In accordance with the present disclosure, the television 314 and the connected devices may individually or collectively be configured to derive user availability and status information. The television 314 and/or its connected devices may communicate the user availability and status information to the availability server 300 within media update messages via the media network 316.

A calendar server 318 may be in communication with the availability server 300 or its functionality may be a part of the availability server 300. The calendar server 318 may be configured to store calendar information for requested users such as User B. The calendar information may indicate an availability of a requested user and a status of the requested user. The calendar information may be used by the availability server 300 for use in determining user contexts for requested users in accordance with embodiments of the present disclosure.

The availability server 300 may receive and monitor the communications request and user response information, location information, and media update information from various sources as described with respect to FIG. 3. The information may be used for determining an indication of user availability as disclosed herein. For example, such information may be monitored for the User B. The information may be used by the availability server 300 for determining an indication of the user availability of user B. The availability server 300 may provide the user availability information to subscribers 312. The information may be provided to the subscribers or other requesting users who have registered for availability information for user B.

Figure 4A:
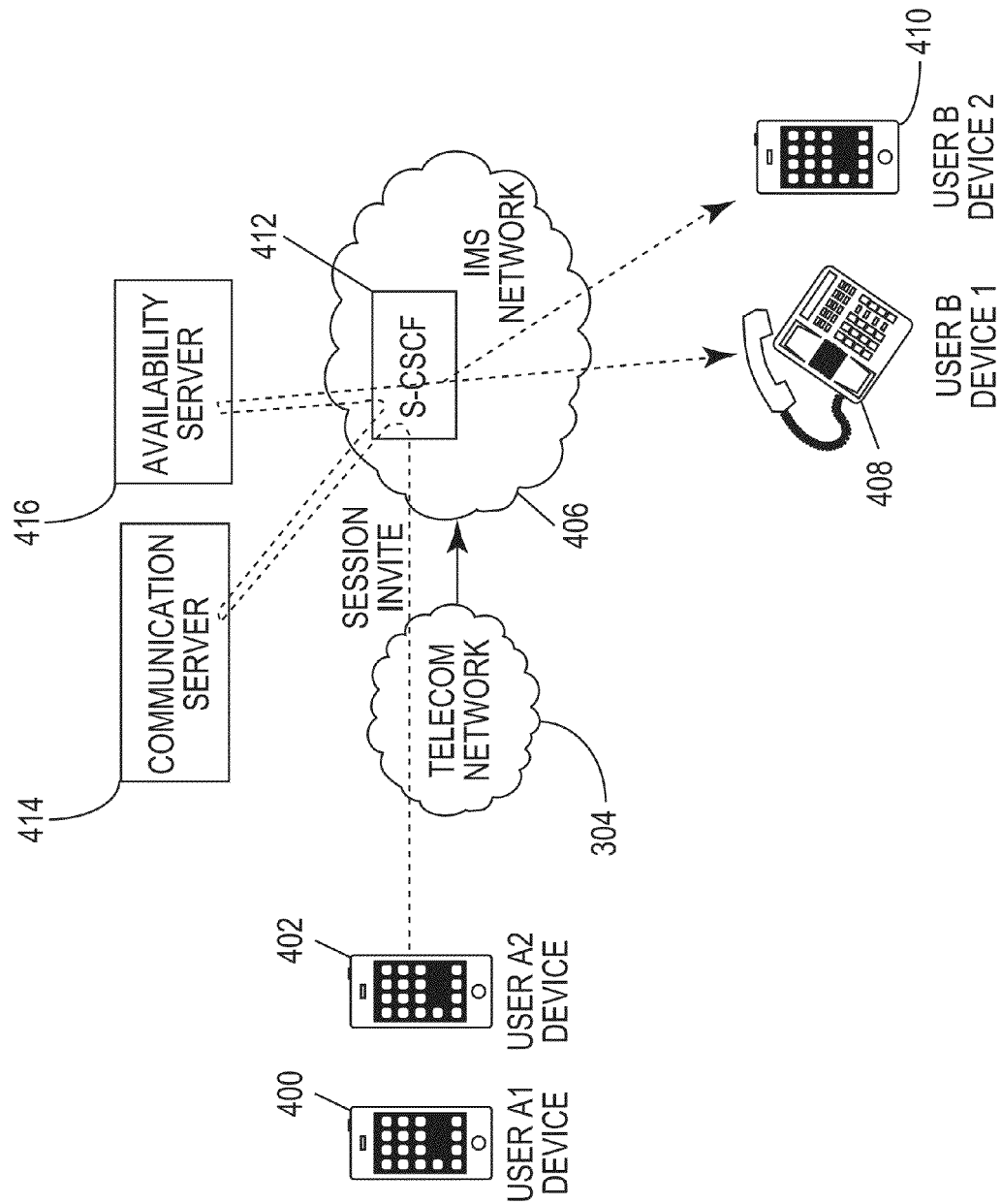
FIGS. 4A and 4B are network diagrams depicting an IMS network in scenarios of sending a communications request to a receiving user and of receiving an indication of user availability, respectively, in accordance with embodiments of the present disclosure.
Figure 4B:
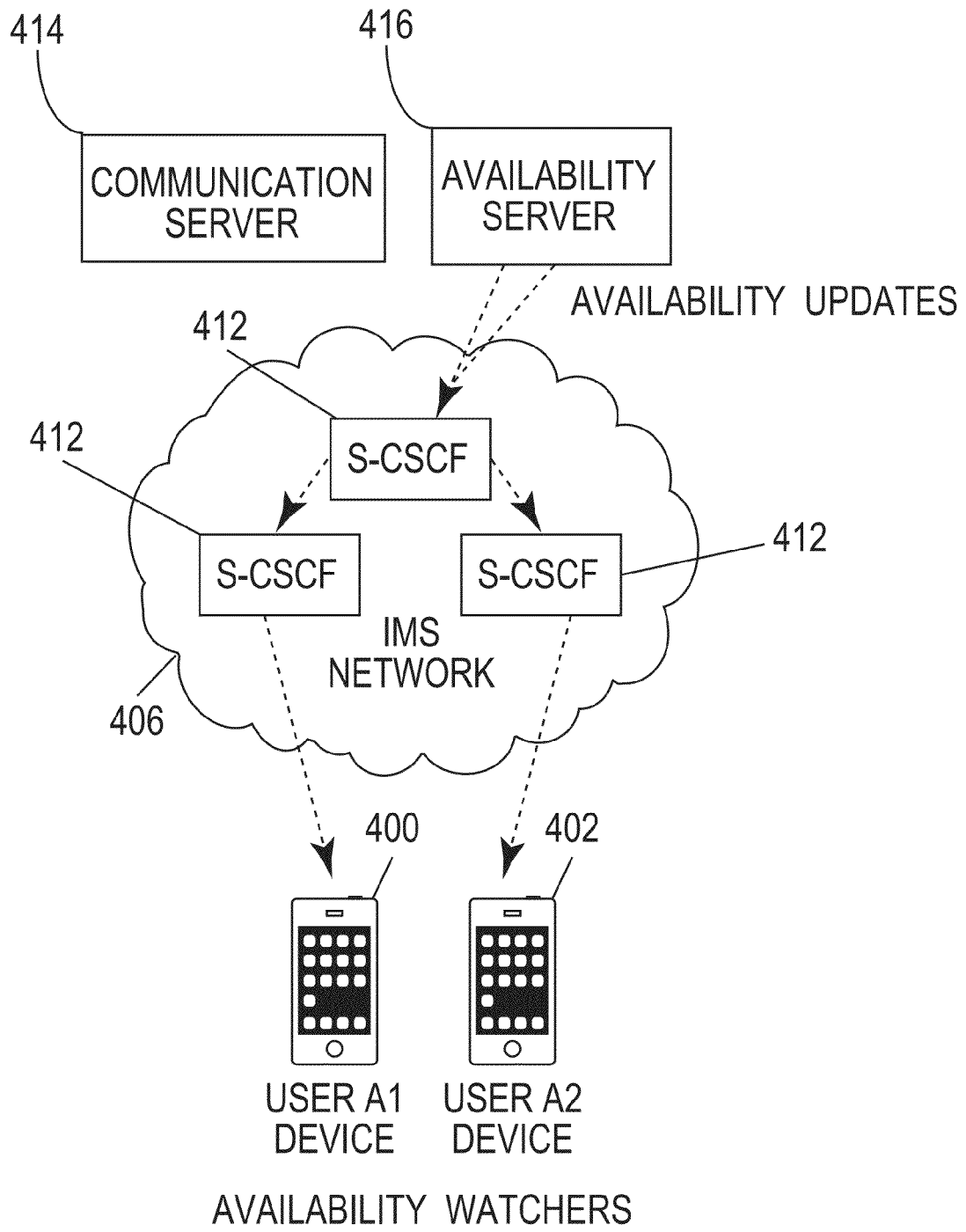

FIGS. 4A and 4B illustrate network diagrams depicting an IMS network in scenarios of sending a communications request to a receiving user and of receiving an indication of user availability, respectively, in accordance with embodiments of the present disclosure. Referring to FIG. 4A, user A1 device 400 and user A2 device 402, may each communicate a session invite message for initiating a telephone communication with User B. The session invite message may be communicated from a telecommunications network 404 to an IMS network 406 for delivery to User B device 408 and User B device 410. A serving-call session control function (S-CSCF) residing on an IMS server 412 may receive the session setup messages and route the messages to a communication server 414 for suitable processing. After local processing, the communication server 414 routes the session invite to the S-CSCF which may then route the messages to an availability server 416, which may monitor the communication sessions for User B and route back the session setup messages to the S-CSCF. The S-CSCF may route the session setup messages to devices 408 and 410 for requesting a telephone communication. One or both of the devices 408 and 410 may respond to the request. Being in the signaling path, information regarding the response is received by the availability server 416, which may determine user contexts and an indication of user availability for user B in accordance with the present disclosure.

Referring to FIG. 4B, the availability server 416 may provide the indication of user availability of user B to users A1 and A2. In this example, the user availability information may be communicated to devices 400 and 402 via the IMS network 406. The user availability information may be communicated via the IMS network 406 by use of one or more S-CSCFs 412 as shown in FIG. 4B.

Figure 5A:
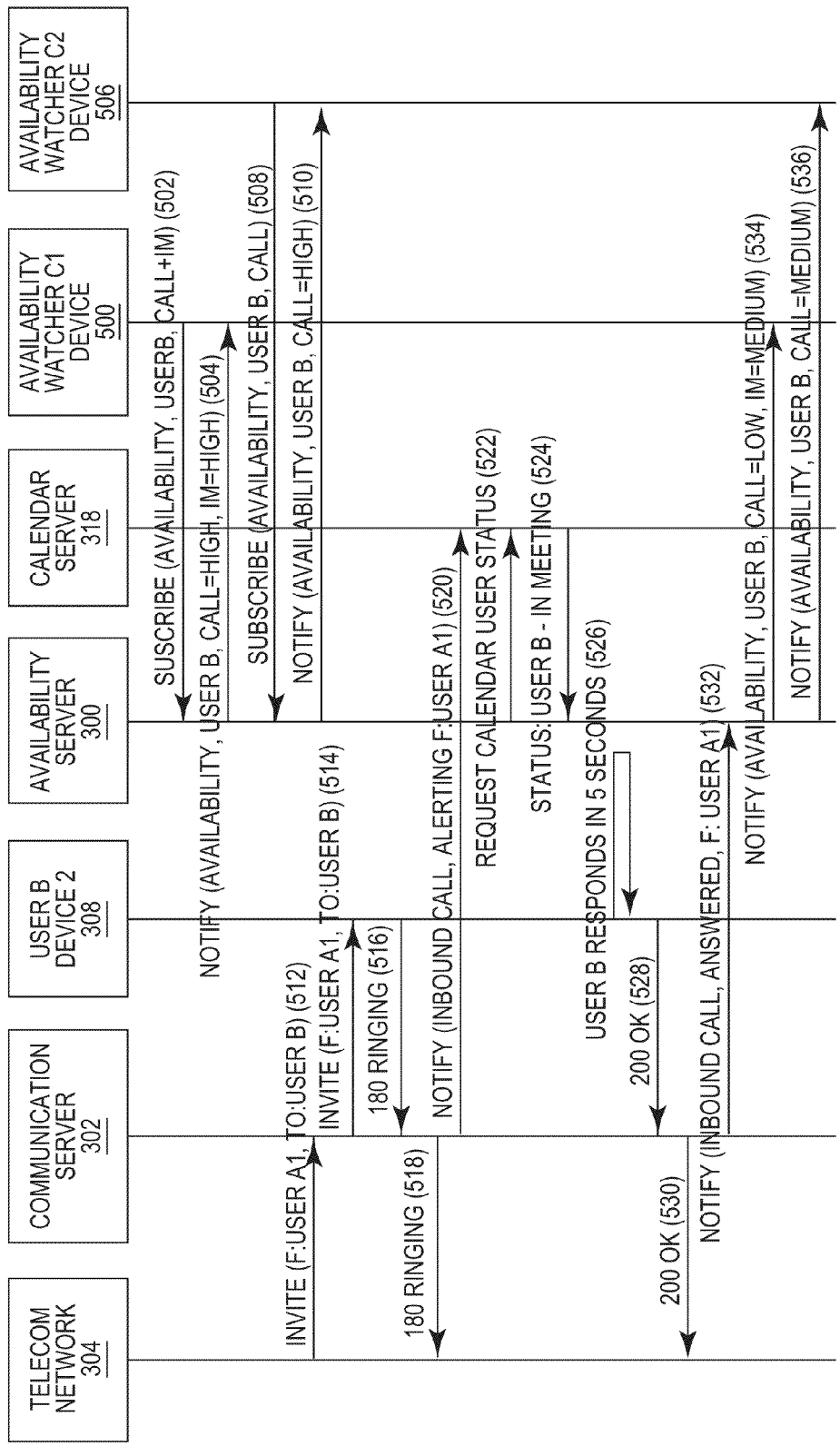
FIGS. 5A and 5B depict a message flow diagram of an exemplary method of deriving user availability from user context and user responses to communications requests in accordance with embodiments of the present disclosure.
Figure 5B:
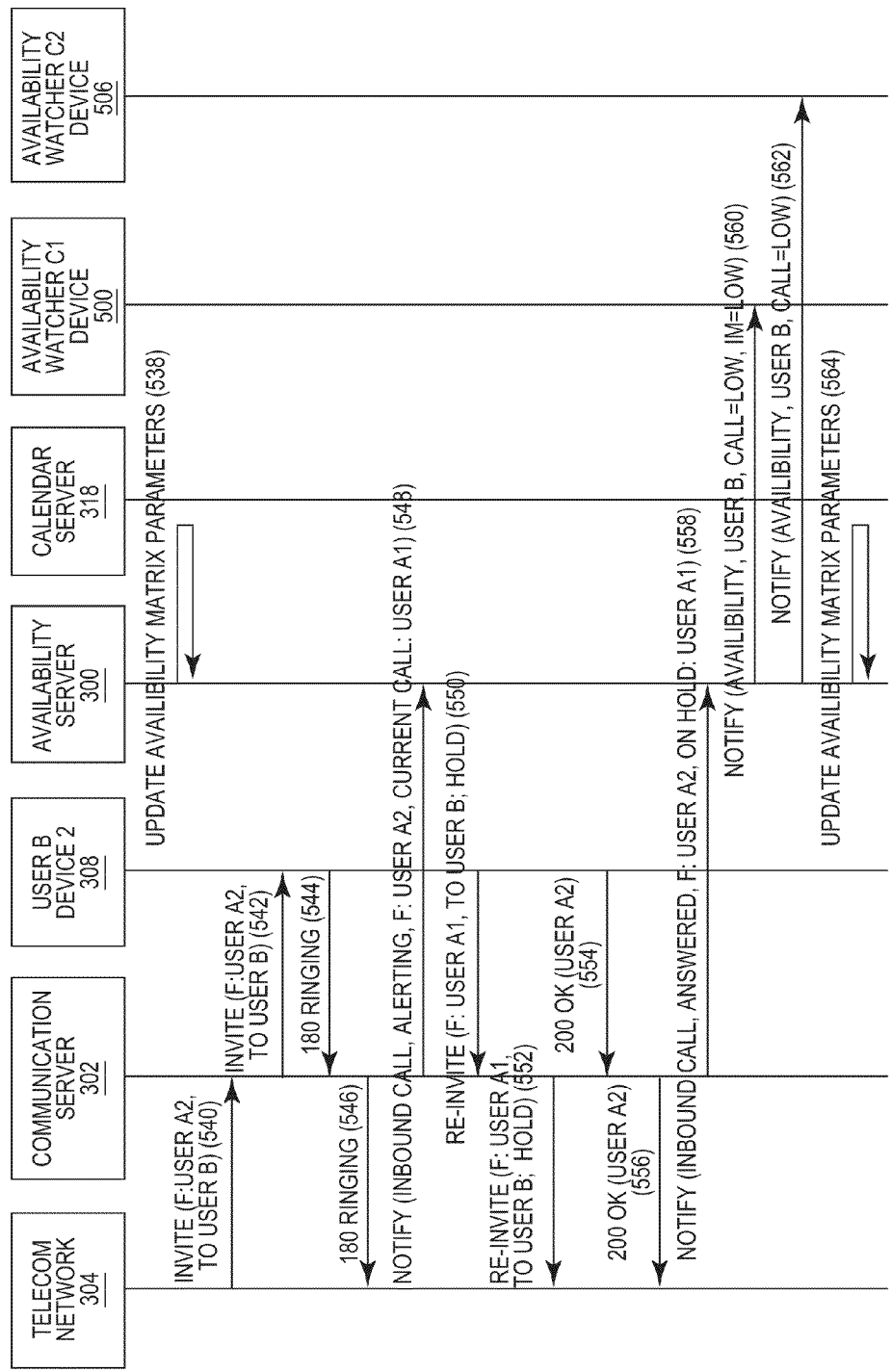

In accordance with embodiments of the present disclosure, FIGS. 5A and 5B depict a message flow diagram of an exemplary method of deriving user availability from user context and user responses to communications requests. Referring to FIG. 5A, an availability watcher C1 device 500 (e.g., a mobile telephone) may send a user availability subscribe message to the availability server 300 (step 502). The subscriber message may indicate that it is a request for subscribing to user availability information for user B for both call and IM communications. In response to the request and if watcher C1 is authorized to monitor availability for user B, the availability server 300 may register the availability watcher C1 and may respond with a notify message to the device 500 (step 504). The notify message may indicate that the message includes user availability information for user B, that user B's availability for calls is high, and that user B's availability for IMs is high.

An availability watcher C2 device 506 (e.g., a mobile telephone) may send a user availability subscribe message to the availability server 300 (step 508). The subscriber message may indicate that it is a request for subscribing to user availability information for user B for call communications. In response to the request and if watcher C2 is authorized to monitor availability for user B, the availability server 300 may register the availability watcher C2 and may respond with a notify message to the device 506 (step 510). The notify message may indicate that the message includes user availability information for user B and that user B's availability for calls is high.

Various techniques can be used to authorize watchers. For example, a potential watcher may send an authorization request to the availability server for User B. The availability server sends a message to User B's devices requesting User B authorization. If User B agrees, a message is sent from one of User B's devices to the availability server to authorize the new watcher.

Within the telecommunications network 304, an electronic device (not shown) of user A1 may initiate a telephone call with user B for which an INVITE message is communicated to the communication server 302 (step 512). Subsequently, the communication server 302 may route the INVITE message to the user B device 308 for notifying the device 308 of the call request (step 514). In response, the device 308 may communicate a 180 ringing response to the communication server 302 (step 516), which is routed to the network 304 (step 518).

In response to receipt of the INVITE message at step 512 and the 180 ringing response message at step 516, the communication server 302 may communicate a notify message to the availability server 300 for indicating that user B is being alerted to an inbound call (step 520). In response to receipt of the notify message, the availability server 300 may communicate a request to the calendar server 318 for calendar user status information for user B (step 522). In response to receipt of the request for the calendar user status information, the calendar server 318 may retrieve the information for user B, which indicates that user B is in a meeting. The calendar server 318 may then report the status information to the availability server 300 for indicating that user B is in a meeting (step 524).

At step 526, a user B may respond in 5 seconds of receipt of the INVITE message at step 514 by answering the call. In response to answering the call, the device 308 may communicate a 200 OK message to the communication server 302 (step 528), which forwards the 200 OK message to the network 304 (step 530).

In response to receipt of the 200 OK message at step 528, the communication server 302 notifies the availability server 300 that the call has been answered by user B (step 532). In response to receipt of the notification, the availability server 300 may generate a notify message including indications of user availability of user B based on notification that user B answered the call. For availability watcher C1, the indication may indicate that call availability is low and IM availability is medium for user B. For availability watcher C2, the indication may indicate that call availability is medium for user B. The availability levels are different in this example, because the rules applied to the different availability watchers C1 and C2 are set differently. The availability server 300 may communicate the notify messages to availability watchers C1 and C2 in steps 534 and 536. In addition, referring now to FIG. 5B, the availability server 300 may update availability matrix parameters for user B (step 538).

In step 540, within the telecommunications network 304, an electronic device (not shown) of user A2 may initiate a telephone call with user B for which an INVITE message is communicated to the communication server 302. Subsequently, the communication server 302 may route the INVITE message to the user B device 308 for notifying the device 308 of the call request (step 542). In response, the device 308 may communicate a 180 ringing response to the communication server 302 (step 544), which is routed to the network 304 (step 546).

In response to receipt of the INVITE message at step 540 and the 180 ringing response message at step 544, the communication server 302 may communicate a notify message to the availability server 300 for indicating that user B is being alerted to an inbound call and is currently in a call with user A1 (step 548).

Assuming that user B wants to answer this second call without losing the first call, at step 550, the user B device 308 may communicate a re-INVITE message to the communication server 302 requesting that user A1 is put on hold. The re-INVITE message is subsequently communicated to the network 304 (step 552). Subsequently, to answer the second call, the device 308 communicates a 200 OK message to the communication server 302 (step 554), which forwards the 200 OK message to the network 304 (step 556).

In response to receipt of the 200 OK message at step 556, the communication server 302 notifies the availability server 300 that the call has been answered by user B and that the previous call is on hold (step 558). In response to receipt of the notification, the availability server 300 may generate a notify message including indications of user availability of user B based on the notification that user B answered the second call and that the first call is on hold. Since user B is now involved with two calls, the overall availability for user B is reduced. Consequently, for availability watcher C1, the indication may indicate that call availability is low and IM availability is low for user B. For availability watcher C2, the indication may indicate that call availability is low for user B. The availability server 300 may communicate the notify messages to availability watchers C1 and C2 in steps 560 and 562. In addition, the availability server 300 may update availability matrix parameters for user B (step 564).

Figure 6:
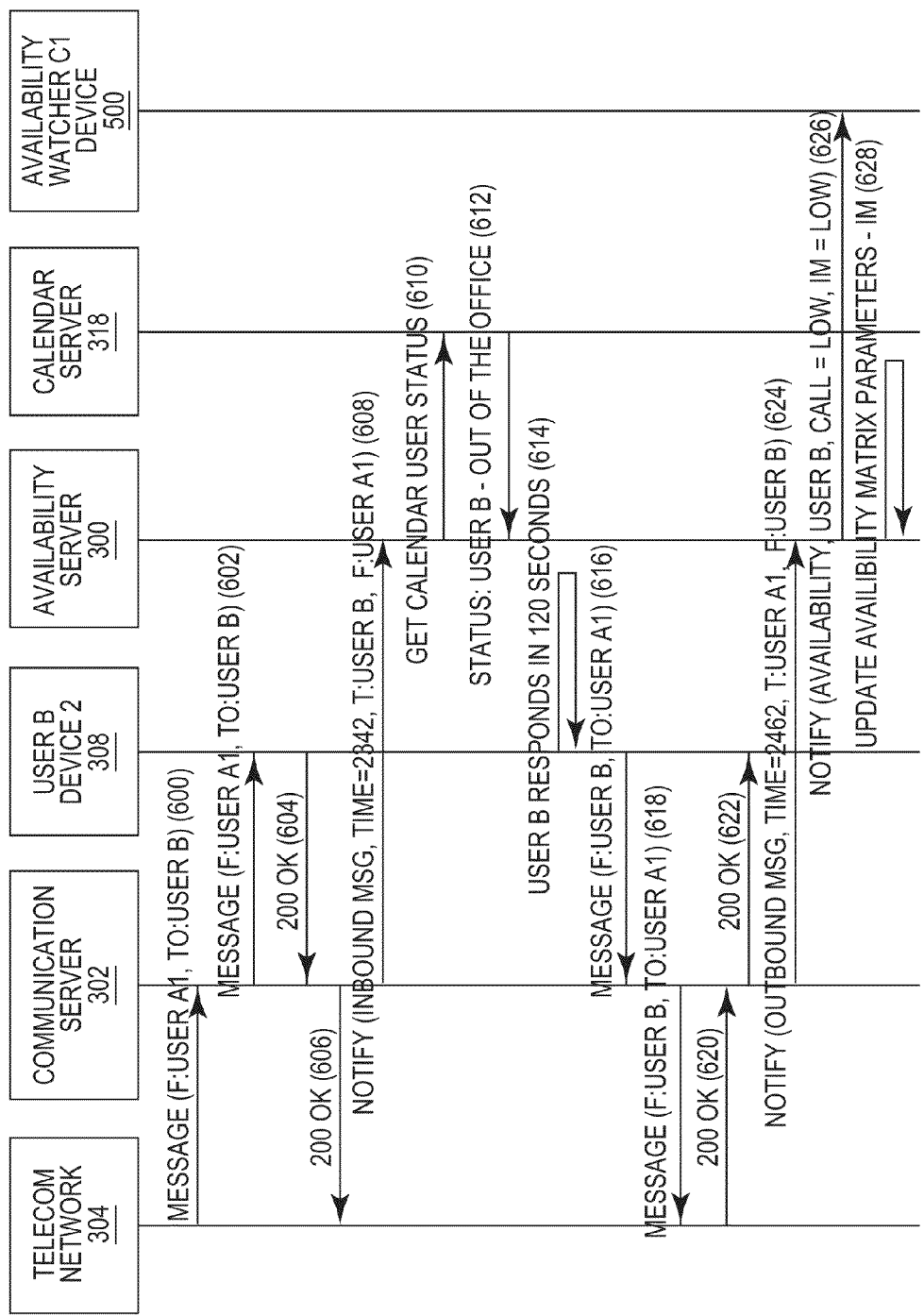
FIG. 6 is a message flow diagram of another exemplary method of deriving user availability from user context and user responses to communications requests in accordance with embodiments of the present disclosure.

In accordance with embodiments of the present disclosure, FIG. 6 illustrates a message flow diagram of another exemplary method of deriving user availability from user context and user responses to communications requests. Referring to FIG. 6, an electronic device (not shown) of user A1 within the network 304 may communicate an IM message to the communication server 302 for delivery to user B device 308 (step 600). The communication server 302 subsequently communicates the IM message to device 308 (step 602). In response, the device 308 communicates to the communication server 302 a 200 OK message (step 604), which is forwarded to the network 304 (step 606).

In response to receipt of the IM message at step 600 and the 200 OK message at step 604, the communication server 302 notifies the availability server 300 of the IM message from User A1 to user B and the time (step 608). In response to receipt of the notification, the availability server 300 may communicate a request to the calendar server 318 for calendar user status information for user B (step 610). In response to receipt of the request for the calendar user status information, the calendar server 318 may retrieve the information for user B, which indicates that user B is out of the office. The calendar server 318 may then report the status information to the availability server 300 for indicating that user B is out of the office (step 612).

At step 614, a user B may respond in 120 seconds of receipt of the IM message at step 602 by replying to the IM message, which is communicated to the communication server 302 (step 616). Subsequently, the reply IM message is forwarded to the network 304 (step 618). In response the network 304 communicates to the communication server 302 a 200 OK message (step 620), which is forwarded to the device 308 (step 622).

In response to receipt of the message at step 616 and the 200 OK message at step 620, the communication server 302 notifies the availability server 300 that the IM message has been answered by user B (step 624). In addition, the message may indicate the time. Given the long response time, in response to receipt of the notification, the availability server 300 may generate a notify message to device 500 that indicates that call availability is low and IM availability is low for user B (step 626). In addition, the availability server 300 may update availability matrix parameters for user B (step 628).

Figure 7A:
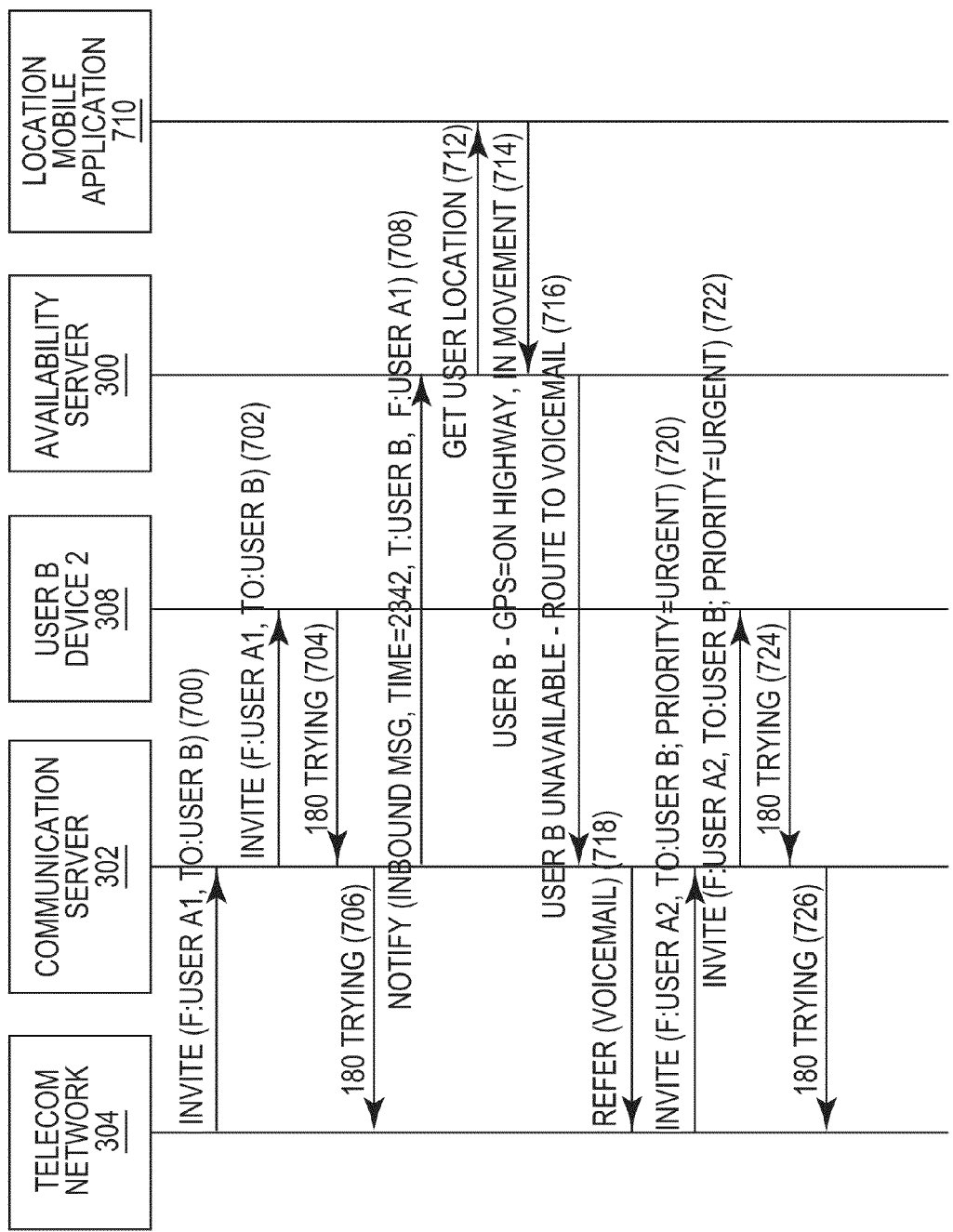
FIGS. 7A and 7B depict a message flow diagram of another exemplary method of deriving user availability from user context and user responses to communications requests in accordance with embodiments of the present disclosure.
Figure 7B:
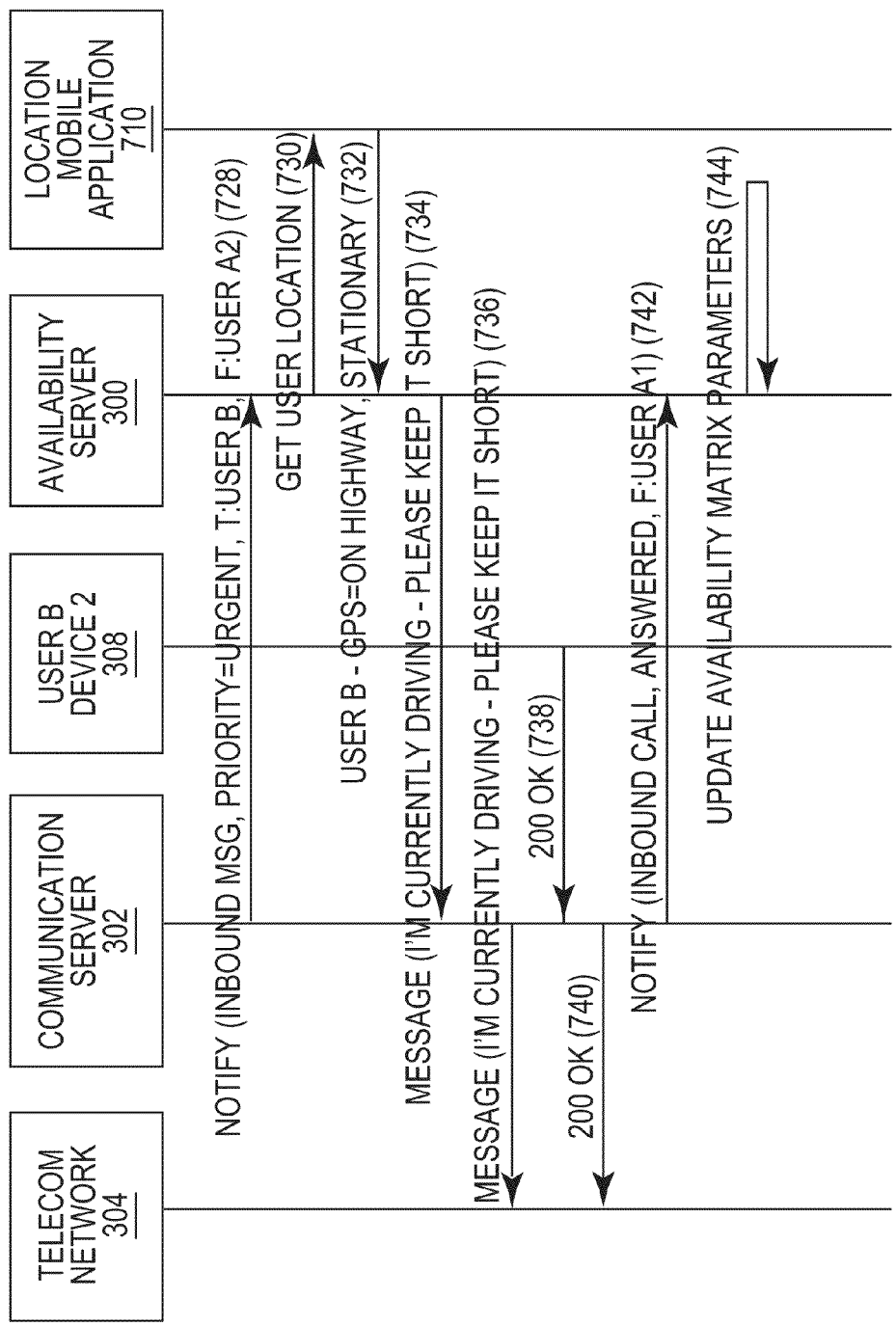

In accordance with embodiments of the present disclosure, FIGS. 7A and 7B depict a message flow diagram of another exemplary method of deriving user availability from user context and user responses to communications requests. Referring to FIG. 7A, an electronic device (not shown) of user A1 may initiate a telephone call with user B for which an INVITE message is communicated to the communication server 302 (step 700). Subsequently, the communication server 302 may route the INVITE message to the user B device 308 for notifying the device 308 of the call request (step 702). In response, a 180 trying message may be sent to the communication server 302 for indicating that a communication attempt is being made (step 704). The 180 trying message is also communicated from communication server 302 to the network 304 (step 706).

In response to receipt of the INVITE message at step 700 and the 180 trying message at step 704, the communication server 302 may communicate a notify message to the availability server 300 for indicating that user A1 is trying to call user B (step 708). In response to receipt of the notify message, the availability server 300 may communicate to a location mobile application 710, a message for requesting a user location of the device 308 (step 712). The application 710 may be implemented by a network server. In response to receipt of the request for user location, the application 710 may determine that user B is located on a highway and currently in movement, and may communicate a message to the availability server 300 to indicate the location and movement of user B (step 714).

In response to receipt of the message at step 714, the availability server 300 may deduce that user B is busy and unavailable for a call since he or she is in movement. Further, the availability server 300 may communicate a message to the communication server 302 for indicating that user B is unavailable and to request for the call to be routed to user B's voicemail (step 716). In response to receipt of the message at step 716, the communication server 302 may communicate a REFER message to network 304 for the call to be routed to user B's voicemail (step 718). The subsequent steps required to complete the connection to the voicemail are not shown for simplification of illustration but should be understood to those of skill in the art.

At step 720, an electronic device (not shown) of user A2 may initiate another telephone call with user B for which an INVITE message with priority "urgent" is communicated to the communication server 302. Subsequently, the communication server 302 may route the INVITE message to the user B device 308 for notifying the device 308 of the call request (step 722). In response, a 180 trying message may be sent to the communication server 302 for indicating that a communication attempt is being made (step 724). The 180 trying message is also communicated from communication server 302 to the network 304 (step 726).

Referring now to FIG. 7B, in response to receipt of the INVITE message at step 720 and the 180 trying message at step 724, the communication server 302 communicates a notify message to the availability server 300, to indicate a call from user A2 to user B with an "urgent" priority (step 728). In response to receipt of the notify message, the availability server 300 may communicate to the location mobile application 710, a message for requesting a user location of the device 308 (step 730). In response to receipt of the request for user location, the application 710 may determine that user B is located on a highway and currently stationary, and may communicate a message to the availability server 300 to indicate the location and movement of user B (step 732).

In response to receipt of the message at step 732, the availability server 300 may deduce that user B is available for a short call, and as a result, may communicates to the communication server 302 a predefined message for indicating that user B is currently driving and for requesting that the caller keep his or her message short (step 734), which may be forwarded by the communication server 302 to the network 304 for delivery to the electronic device of A2 (step 736).

Further, device 308 communicates to the communication server 302 a 200 OK message (step 738), which is forwarded by the communication server 302 to the network 304 (step 740).

At step 742, the communication server 302 may communicate to the availability server 300, a notify message to indicate that the call from user A1 has been answered. In addition, the availability server 300 may update availability matrix parameters for user B (step 744).

Figure 8:
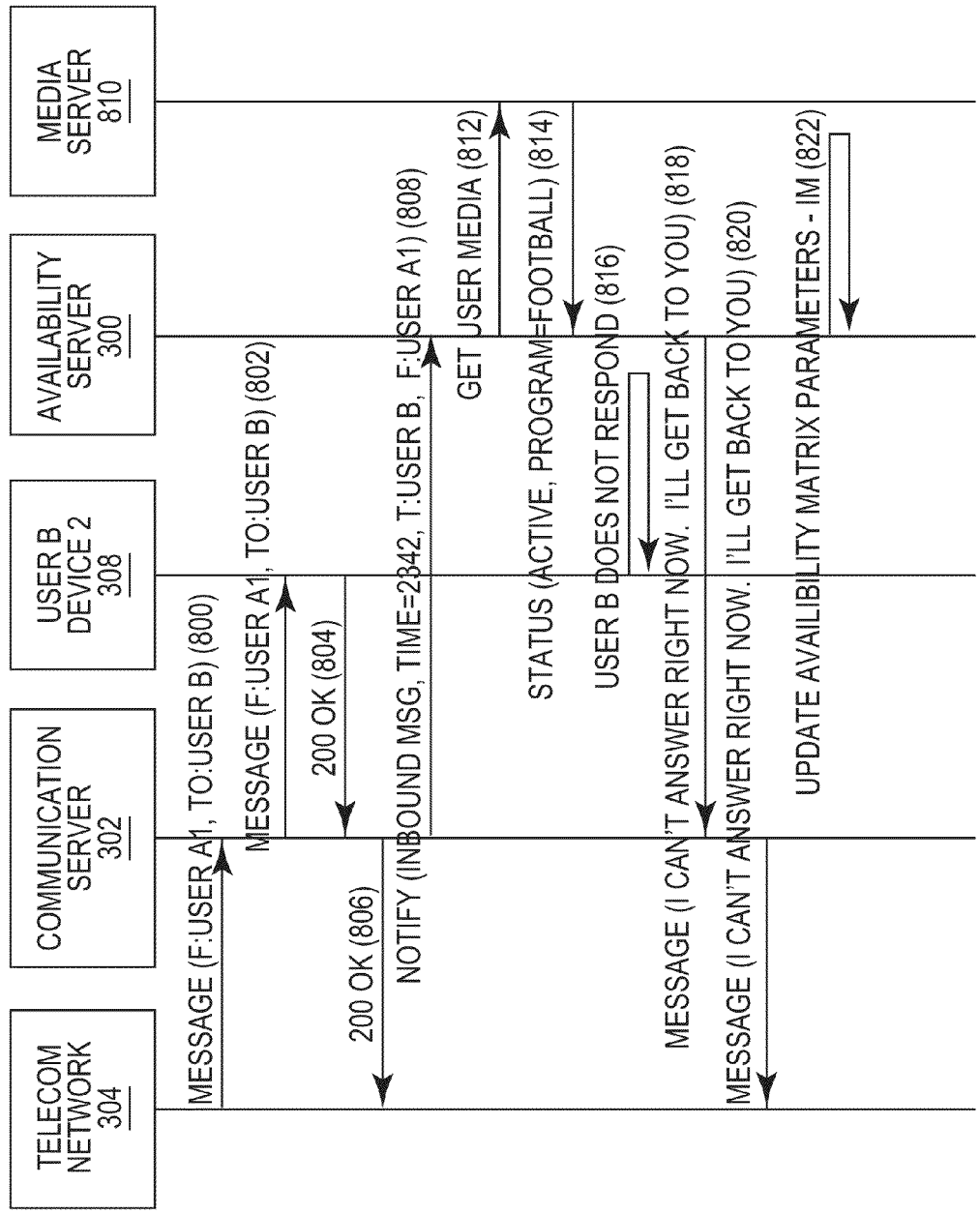
FIG. 8 illustrates a message flow diagram of another exemplary method of deriving user availability from user context and user responses to communications requests in accordance with embodiments of the present disclosure.

In accordance with embodiments of the present disclosure, FIG. 8 illustrates a message flow diagram of another exemplary method of deriving user availability from user context and user responses to communications requests. Referring to FIG. 8, an electronic device (not shown) of user A1 within the network 304 may communicate a message to the communication server 302 for delivery to user B device 308 (step 800). The communication server 302 subsequently communicates the IM message to device 308 (step 802). In response, the device 308 communicates to the communication server 302 a 200 OK message (step 804), which is forwarded to the network 304 (step 806).

In response to receipt of the message at step 800 and the 200 OK message at step 804, the communication server 302 notifies the availability server 300 of the message from User A1 to user B and the time (step 808). In response to receipt of the notification, the availability server 300 may communicate a request to a media server 318 for media status information for user B (step 812). In response to receipt of the request for the media status information, the media server 810 may retrieve the information for user B, which indicates that user B is actively watching a football program. The media server 810 may then report the media status information to the availability server 300 for indicating that user B is out of the office (step 814).

At step 816, user B does not respond to the message of step 802. After a period of time of no respond by user B, the availability server 808 communicates to the communication server 302, a message indicating that user B cannot answer now but will reply later (step 818). The communication server 302 may subsequently send the message to the network 304 for communication to user A1 (step 820). In addition, the availability server 300 may update availability matrix parameters for user B (step 822).

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method performed by a processor, the method comprising:
   monitoring communications requests, wherein each of the communications requests includes a request for conducting a communication session between a requesting user and a requested user;
   monitoring user responses to the communications requests;
   determining user contexts for the requested user corresponding to each of the communications requests communicated to the requested user;
   determining an indication of user availability for the requested user based in part on prior user responses made by the requested user under user contexts having conditions in common with a current user context of the requested user; and
   providing the indication of user availability to at least one authorized user.

2. The method of claim 1, wherein a type of communications request includes one of a voice call, a video call, an email, a simple message service (SMS) message, an multimedia message service (MMS) message, and an instant message (IM).

3. The method of claim 1, wherein monitoring the communications requests includes monitoring one of a source of communications request, a location of a communications request, a time of communications request, and a type of communications request.

4. The method of claim 3, wherein the location of communications request is one of user-determined or automatically determined using global positioning system (GPS).

5. The method of claim 1, wherein monitoring the user responses includes: determining whether the communications request was answered; and
   in response to determining that the communications request was answered, determining a response time.

6. The method of claim 1, wherein monitoring the user responses includes one of directly monitoring the plurality of user responses and indirectly monitoring the plurality of user responses.

7. The method of claim 6, wherein directly monitoring the plurality of user responses includes one of intercepting the user responses internally from a communication server or a messaging server, and intercepting the user responses from a node located in the signaling path of the communications request.

8. The method of claim 6, wherein indirectly monitoring the user responses includes receiving one of a real-time notification, call logs, and billing records from one of a communication server and a messaging server.

9. The method of claim 1, wherein determining user contexts includes determining one of presence information, location, calendar, media being consumed by the user, and user-defined information.

10. The method of claim 1, wherein determining user contexts includes determining the user contexts in response to receiving a request.

11. The method of claim 1, wherein determining user contexts includes determining user context from one of a single source and multiple sources.

12. The method of claim 1, wherein determining an indication of user availability includes providing and using one or more rules for weighting the user responses and the user contexts.

13. The method of claim 12, comprising automatically and continuously updating the rules as new communications requests and user responses are monitored.

14. The method of claim 1, wherein providing an indication of user availability includes providing the indication of user availability one of prior to receiving the communications request and simultaneously with receiving the communications request.

15. The method of claim 1, wherein providing the indication of user availability includes one of pushing and pulling the indication of user availability to the requesting user,
   wherein pushing the indication of user availability includes sending the indication of user availability in the absence of receiving a request for the indication of user availability, and
   wherein pulling the indication of user availability includes returning the indication of user availability to the at least one authorized user in response to receiving a request for the indication of user availability.

16. The method of claim 1, wherein providing the indication of user availability includes providing the indication of user availability to one or more users in addition to the requesting user.

17. The method of claim 1, wherein providing the indication of user availability includes providing the indication of user availability for one of a specific type of communication request, a particular requesting user, and a group of requesting users.

18. A system comprising:
   a processor based service node comprising:
      a communications module configured to:
         monitor communications requests, wherein each of the communications requests includes an electronic request for conducting a communication session between a requesting user and a requested user; and
         monitor user responses to the communications requests; and
      a user availability inference module configured to:
         determine user contexts for the requested user corresponding to each of the communications requests communicated to the requested user;
         determine an indication of user availability for the requested user based in part on prior user responses made by the requested user under user contexts having conditions in common with a current user context of the requested user; and
         provide the indication of user availability to at least one authorized user.

19. The system of claim 18, wherein the type of communications requests includes one of a voice call, a video call, an email, a simple message service (SMS) message, an multimedia message service (MMS) message, and an instant message (IM).

20. The system of claim 18, wherein the communications module is configured to monitor one of a source of communications request, a location of a communications request, a time of communications request, and a type of communications request.

21. The system of claim 19, wherein the location of communications request is one of user-determined and determined using global positioning system (GPS).

22. The system of claim 18, wherein the communications module is configured to:
determine whether the communications request was answered; and
determine a response time in response to determining that the communications request was answered.

23. The system of claim 18, wherein the communications module is configured to monitor communications requests one of directly and indirectly.

24. The system of claim 23, wherein the communications module is integrated with one of a communication server and a messaging server and located in the signaling path of the communications request and is configured to intercept the plurality of user responses.

25. The system of claim 23, wherein the communications module is configured to receive one of a real-time notification, call logs, and billing records from one of a communication server and a messaging server.

26. The system of claim 18, wherein the user availability inference module is configured to determine one of presence information, location, calendar, media being consumed by user, and user-defined information.

27. The system of claim 18, wherein the user availability inference module is configured to determine the user contexts in response to receiving a request or on an ongoing basis.

28. The system of claim 18, wherein the user availability inference module is configured to determine user context from one of a single source and multiple sources.

29. The system of claim 18, wherein the user availability inference module is configured to provide and use one or more rules for combining and weighting the plurality of user responses and the corresponding plurality of user contexts.

30. The system of claim 29, wherein the user availability inference module is configured to automatically and continuously update the rules as new communications requests and user responses are received.

31. The system of claim 18, wherein the user availability inference module is configured to provide the indication of user availability one of prior to receiving the communications request and simultaneously with receiving the communications request.

32. A non-transitory computer readable medium having stored thereon computer executable instructions that when executed by the processor of a computer perform steps comprising:
monitoring communications requests, wherein each of the communications requests includes an electronic request for conducting a communication session between a requesting user and a requested user;
monitoring user responses to the communications requests;
determining user contexts for the requested user corresponding to each of the communications requests communicated to the requested user;
determining an indication of user availability for the requested user based in part on prior user responses made by the requested user under user contexts having conditions in common with a current user context of the requested user; and
providing the indication of user availability to at least one authorized user.

33. A method performed by a processor, the method comprising:
monitoring communications requests, wherein each of the communications requests includes a request for conducting a communication session between a requesting user and a requested user;
monitoring user responses to the communications requests;
determining user contexts for the requested user corresponding to each of the communications requests communicated to the requested user from the requesting user;
determining an indication of user availability for the requested user based in part on prior user responses made by the requested user under user contexts having conditions in common with a current user context of the requested user; and
providing the indication of user availability to at least one authorized user.

34. The method of claim 33, wherein providing the indication of user availability includes providing the indication of user availability for a specific type of communication mode.

35. The method of claim 33, wherein the indication of user availability comprises a granularity of a linear range of numbers.

* * * * *